(12) United States Patent
Lee

(10) Patent No.: US 7,561,237 B2
(45) Date of Patent: *Jul. 14, 2009

(54) IN-PLANE SWITCHING MODE LIQUID CRYSTAL DISPLAY DEVICE AND METHOD OF FABRICATING THE SAME

(75) Inventor: Yun-Bok Lee, Seoul (KR)

(73) Assignee: LG Display Co., Ltd., Seoul (KR)

( * ) Notice: Subject to any disclaimer, the term of this patent is extended or adjusted under 35 U.S.C. 154(b) by 98 days.

This patent is subject to a terminal disclaimer.

(21) Appl. No.: 11/648,641

(22) Filed: Jan. 3, 2007

(65) Prior Publication Data
US 2007/0109480 A1    May 17, 2007

Related U.S. Application Data

(62) Division of application No. 10/824,612, filed on Apr. 15, 2004, now Pat. No. 7,177,001.

(30) Foreign Application Priority Data
Dec. 11, 2003    (KR) ............ 10-2003-0090413

(51) Int. Cl.
*G02F 1/1335*    (2006.01)
(52) U.S. Cl. .............. 349/141; 349/129; 349/146
(58) Field of Classification Search ............. 349/129, 349/139, 141, 143, 146
See application file for complete search history.

(56) References Cited

U.S. PATENT DOCUMENTS

| | | | |
|---|---|---|---|
| 5,069,813 A | 12/1991 | Patel | |
| 5,434,687 A | 7/1995 | Kawata et al. | |
| 5,610,743 A | 3/1997 | Tsai | |
| 5,977,562 A * | 11/1999 | Hirakata et al. | 257/72 |
| 6,243,154 B1 | 6/2001 | You et al. | |
| 6,583,840 B1 * | 6/2003 | Inoue et al. | 349/141 |
| 7,177,001 B2 * | 2/2007 | Lee | 349/141 |
| 7,227,607 B2 * | 6/2007 | Lee | 349/141 |
| 7,420,641 B2 * | 9/2008 | Lee et al. | 349/141 |
| 2002/0093614 A1 | 7/2002 | Moon et al. | |
| 2003/0053020 A1 | 3/2003 | Okata et al. | |

(Continued)

FOREIGN PATENT DOCUMENTS

JP    09-230311    9/1997

(Continued)

*Primary Examiner*—Dung T. Nguyen
(74) *Attorney, Agent, or Firm*—McKenna Long & Aldridge LLP

(57) ABSTRACT

An in-plane switching mode liquid crystal display device includes: first and second substrates facing and spaced apart from each other; a gate line on the first substrate; a data line crossing the gate line to define a pixel region including a plurality of domains; a thin film transistor connected to the gate line and the data line; a common line parallel to and spaced apart from the gate line; a common electrode extending from the common line and having a ring shape; a pixel electrode connected to the thin film transistor and having a ring shape, the pixel electrode alternating with the common electrode; and a liquid crystal layer between the pixel electrode and the second substrate, the liquid crystal layer in neighboring domains having orientation directions different from each other.

8 Claims, 7 Drawing Sheets

U.S. PATENT DOCUMENTS

2005/0128409 A1* 6/2005 Lee .................. 349/141

FOREIGN PATENT DOCUMENTS

| | | |
|---|---|---|
| JP | 9-325340 | 12/1997 |
| JP | 9-325450 | 12/1997 |
| JP | 2002-229046 | 8/2002 |
| JP | 2003-186017 | 7/2003 |
| KR | 10-1999-058889 | 7/1999 |
| KR | 1999-0058889 | 7/1999 |
| KR | 2000-059783 | 10/2000 |
| KR | 1999-058889 | 10/2001 |

* cited by examiner

IN-PLANE SWITCHING MODE LIQUID CRYSTAL DISPLAY DEVICE AND METHOD OF FABRICATING THE SAME

This application is a divisional application of U.S. patent application Ser. No. 10/824,612, filed Apr. 15, 2004, now U.S. Pat. No. 7,177,001, which claims priority to Korean Patent Application No.: 10-2003-0090413, filed Dec. 11, 2003, all of which are incorporated by reference for all purposes as if fully set forth herein.

BACKGROUND OF THE INVENTION

1. Field of the Invention

The present invention relates to a liquid crystal display device. More particularly, it relates to an in-plane switching mode liquid crystal display (IPS-LCD) device where brightness of black color is improved.

2. Discussion of the Related Art

Liquid crystal display (LCD) devices are being developed as the next generation of display devices because of their characteristics of light weight, thin profile, and low power consumption. In general, an LCD device is a non-emissive display device that displays images by making use of a refractive index difference through utilizing optical anisotropy properties of a liquid crystal material interposed between an array substrate and a color filter substrate. Of the different types of known liquid crystal displays (LCDs), active matrix LCDs (AM-LCDs), which have thin film transistors (TFTs) and pixel electrodes arranged in a matrix form, are the subject of significant research and development because of their high resolution and superiority in displaying moving images.

In a conventional LCD device, since the pixel electrodes and common electrodes are positioned on the lower and upper substrates, respectively, a longitudinal electric field is induced perpendicularly between the lower and upper substrates. The conventional LCD devices have high transmittance and high aperture ratio. However, the conventional LCD devices using the longitudinal electric field have a drawback in that they have a very narrow viewing angle. In order to solve the problem of narrow viewing angle, in-plane switching liquid crystal display (IPS-LCD) devices have been proposed.

The IPS-LCD devices typically include a lower substrate on which pixel electrodes and common electrodes are disposed. A liquid crystal layer is interposed between the upper and lower substrates. The upper substrate does not have any electrodes. A detailed explanation about the operational modes of a typical IPS-LCD panel will be provided while referring to FIG. 1.

FIG. 1 is a cross-sectional view illustrating the concept of a related art IPS-LCD panel. As shown in FIG. 1, an upper substrate 20 and a lower substrate 10 are spaced apart from each other, and a liquid crystal layer 30 is interposed therebetween. The upper substrate 20 and lower substrate 10 are often referred to as a color filter substrate and an array substrate, respectively. A common electrode 12 and a pixel electrode 14 are positioned on the lower substrate 10. The common electrode 12 and pixel electrode 14 are positioned such that they are parallel to each other. On a surface of the upper substrate 20, a color filter layer (not shown) is commonly positioned to correspond to an area between the pixel electrode 14 and the common electrode 12 of the lower substrate 10.

A voltage applied across the common electrode 12 and pixel electrode 14 produces an in-plane electric field "IF" through the liquid crystal molecules 32 of the a liquid crystal layer 30. The liquid crystal molecules 32 have a positive dielectric anisotropy, and thus the liquid crystal molecules 32 will align so as to be in parallel with the electric field "IF." When no electric field is applied between the common electrode 12 and pixel electrode 14, i.e., an "off state", the longitudinal axes of the liquid crystal (LC) molecules 32 are parallel to and form a definite angle with respect to the common electrode 12 and pixel electrode 14. For example, the longitudinal axes of the LC molecules 32 are in parallel with both the common electrode 12 and pixel electrode 14 during an off state. However, when a voltage is applied between the common electrode 12 and pixel electrode 14 during an "on state", a lateral electric field "IF," which is parallel to the surface of the lower substrate 10, occurs between the common electrode 12 and pixel electrode 14. The lateral electric field. "IF" rearranges the LC molecules 32 such that the longitudinal axes of the LC molecules 32 are brought into coincident alignment with the electric field "IF." Since the LC molecules switch directions while maintaining their longitudinal axes in a plane perpendicular to the direct viewing direction of a display, in-plane switching can permit a wide viewing angle for a display device. The viewing angles can range 80 to 85 degrees in up-and-down and left-and-right sides from a line vertical to the IPS-LCD panel, for example.

FIG. 2A is a plane view of an array substrate according to the related art IPS-LCD device and FIG. 2B is a plane view of an array substrate according to another related art IPS-LCD device. The common electrode and the pixel electrode of FIG. 2A are in a stripe pattern, and the common electrode and the pixel electrode of FIG. 2B are in a zigzag pattern. As shown in FIGS. 2A and 2B, a gate line "GL" is transversely arranged across the figures and a data line "DL" is disposed substantially perpendicular to the gate line "GL." A common line "CL" is also transversely arranged across the figures in parallel with the gate line "GL" and is spaced apart from the gate line "GL." A thin film transistor (TFT) "T" is disposed near the crossing of the gate and data lines "GL" and "DL" in each of the figures.

As shown in FIG. 2A, a plurality of common electrodes 40 extend from the common line "CL" and a plurality of pixel electrodes 42 is connected to the TFT "T." The plurality of common electrodes 40 and the plurality of pixel electrodes 42 are parallel to the data line "DL" and alternate with each other. Since a liquid crystal layer is driven with a lateral electric field between the common electrodes 40 and the pixel electrodes 42 in the IPS-LCD device, the viewing angle property is improved. Moreover, the viewing angle property is further improved by adopting a multi domain structure. For example, a structure having a zigzag pattern shown in FIG. 2B has been suggested.

As shown in FIG. 2B, a plurality of common electrodes 50 alternate with a plurality of pixel electrodes 52. The plurality of common electrodes 50 and the plurality of pixel electrodes 52 have a zigzag pattern. Liquid crystal molecules between the common electrode 50 and the pixel electrode 52 are aligned along two directions with a bent portion as a border to constitute a multi domain structure. Accordingly, viewing angle is further improved. However, since directors of liquid crystal molecules are different from each other in the IPS-LCD device including a zigzag pattern, color inversion occurs and enhancement of the viewing angle is limited.

FIGS. 3A and 3B are schematic views showing re-alignment states of liquid crystal molecules in a normally black mode IPS-LCD device having a zigzag pattern according to the related art. FIG. 3A shows an "off state" alignment state when no voltage is applied and FIG. 3B shows "on state" alignment state when a voltage is applied.

The orientation direction in FIG. 3A and FIG. 3B is from 270° to 90°. As shown in FIG. 3A, a long axis "A1" of a liquid crystal molecule 60 corresponds to the orientation direction when no voltage is applied. In this case, a color shift can occur. For example, a bluish color may be observed along a short axis "A2" of the liquid crystal molecule 60, i.e., from 0° to 180°, when the color should be black. This bluish color results from a difference of retardation between the long axis "A1" and the short axis "A2" of the liquid crystal molecule 60, thus degrading the black color. However, when a voltage is applied to a two domain pixel, as shown in FIG. 3B, the liquid crystal molecules 60 are aligned symmetrically in the two domains "D1" and "D2." Thus, the appearance of the black color, depending on the viewing angle, is improved slightly.

SUMMARY OF THE INVENTION

Accordingly, the present invention is directed to an IPS-LCD device that substantially obviates one or more of the problems due to limitations and disadvantages of the related art.

An advantage of the present invention is to provide an IPS-LCD device and a method of fabricating the IPS-LCD device where brightness property of the black color is improved.

Another advantage of the present invention is to provide an IPS-LCD device is increased contrast.

Another advantage of the present invention is to provide an IPS-LCD is an enhanced viewing angle.

Additional features and advantages of the invention will be set forth in the description which follows and in part will be apparent from the description, or may be learned by practice of the invention. These and other advantages of the invention will be realized and attained by the structure particularly pointed out in the written description and claims hereof as well as the appended drawings.

To achieve these and other advantages, an embodiment in accordance with the principles of the present invention provides an in-plane switching mode liquid crystal display device. The in-plane switching mode liquid crystal display device includes: first and second substrates facing and spaced apart from each other; a gate line on the: first substrate; a data line crossing the gate line to define a pixel region including a plurality of domains; a thin film transistor connected to the gate line and the data line; a common line parallel to and spaced apart from the gate line; a common electrode extending from the common line and having a ring shape; a pixel electrode connected to the thin film transistor and having a ring shape, the pixel electrode alternating with the common electrode; and a liquid crystal layer between the pixel electrode and the second substrate, the liquid crystal layer in neighboring domains having orientation directions different from each other.

In another aspect, an in-plane switching mode liquid crystal display device includes: first and second substrates facing and spaced apart from each other; a plurality of gate lines on the first substrate; a plurality of data lines crossing the plurality of gate lines to define a plurality of sub-pixel regions; a thin film transistor connected to the gate line and the data line; a common line parallel to and spaced apart from the gate line; a common electrode extending from the common line and having a ring shape; a pixel electrode connected to the thin film transistor and having a ring shape, the pixel electrode alternating with the common electrode; and a liquid crystal layer between the pixel electrode and the second substrate, the liquid crystal layer in neighboring sub-pixel regions having orientation directions different from each other.

In another aspect, a fabricating method of an in-plane switching mode liquid crystal display device includes: first and second substrates facing and spaced apart from each other; forming a gate line on a first substrate; forming a data line crossing the gate line to define a pixel region including a plurality of domains; forming a thin film transistor connected to the gate line and the data line; forming a common line parallel to and spaced apart from the gate line; forming a common electrode extending from the common line and having a ring shape; forming a pixel electrode connected to the thin film transistor and having a ring shape, the pixel electrode alternating with the common electrode; attaching the first substrate and a second substrate such that the first substrate faces and is spaced apart from the second substrate; forming a liquid layer between the first and second substrates; and orientating the liquid crystal layer in neighboring domains to have orientation directions different from each other.

In another aspect, a fabricating method of an in-plane switching mode liquid crystal display device includes: forming a plurality of gate lines on a first substrate; forming a plurality of data lines crossing the plurality of gate lines to define a plurality of sub-pixel regions; forming a thin film transistor connected to the gate line and the data line; forming a common line parallel to and spaced apart from the gate line; forming a common electrode extending from the common line and having a ring shape; forming a pixel electrode connected to the thin film transistor and having a ring shape, the pixel electrode alternating with the common electrode; attaching the first substrate and a second substrate such that the first substrate faces and is spaced apart from the second substrate; forming a liquid crystal layer between the first and second substrates; orientating the liquid crystal layer in neighboring sub-pixel regions to have orientation directions different from each other.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate an embodiment of the present invention and together with the description serve to explain the principles of that invention.

DETAILED DESCRIPTION OF THE ILLUSTRATED EMBODIMENTS

Reference will now be made in detail to an illustrated embodiment of the present invention, examples of which are shown in the accompanying drawings. Wherever possible, similar reference numbers will be used throughout the drawings to refer to the same or similar parts.

Figure 1:
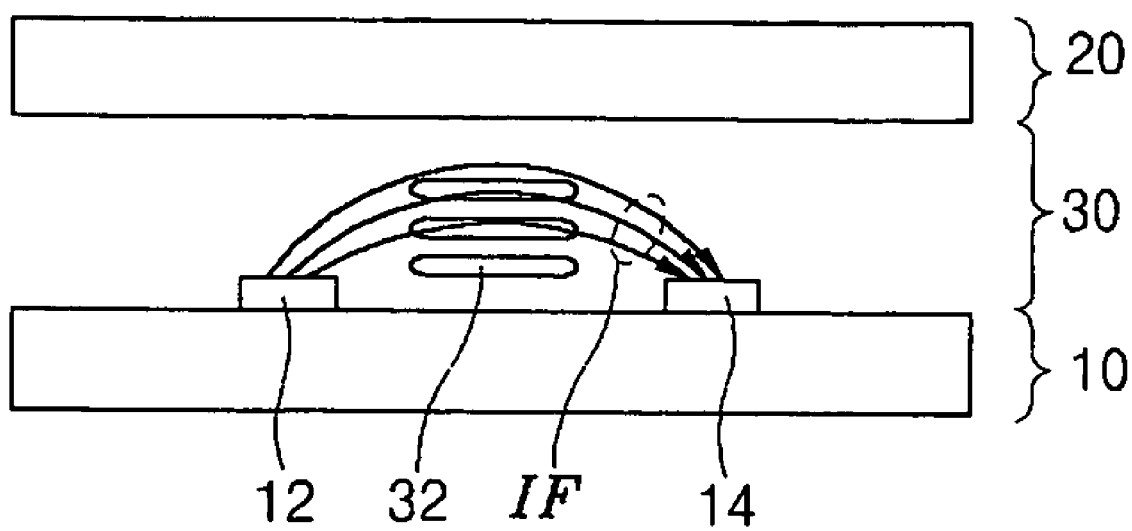
FIG. 1 is a cross-sectional view illustrating a concept of a related art IPS-LCD panel.
Figure 2A:
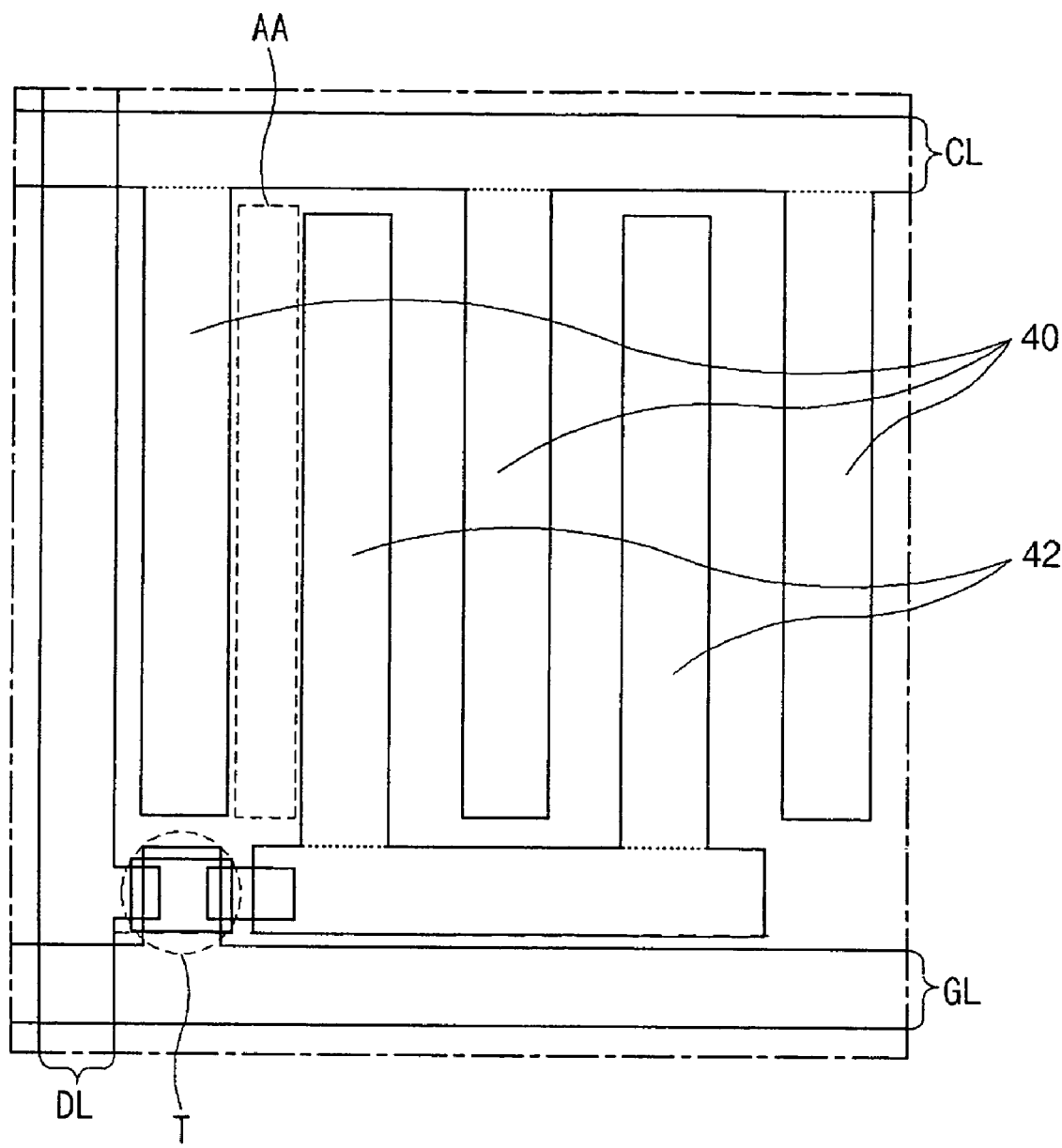
FIG. 2A is a plane view of an array substrate according to the related art IPS-LCD device.
Figure 2B:
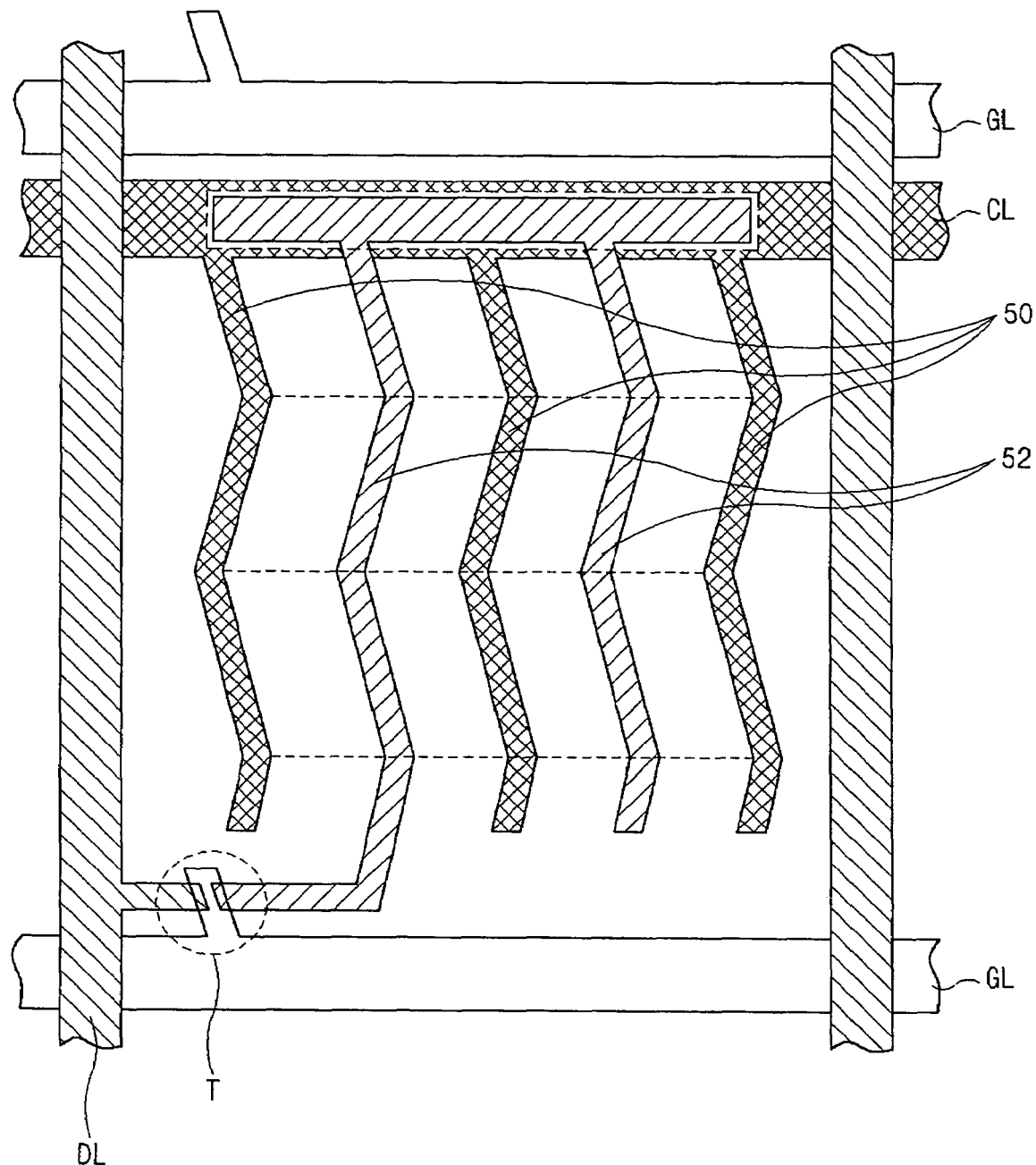
FIG. 2B is a plane view of an array substrate according to another related art IPS-LCD device.
Figure 3A:
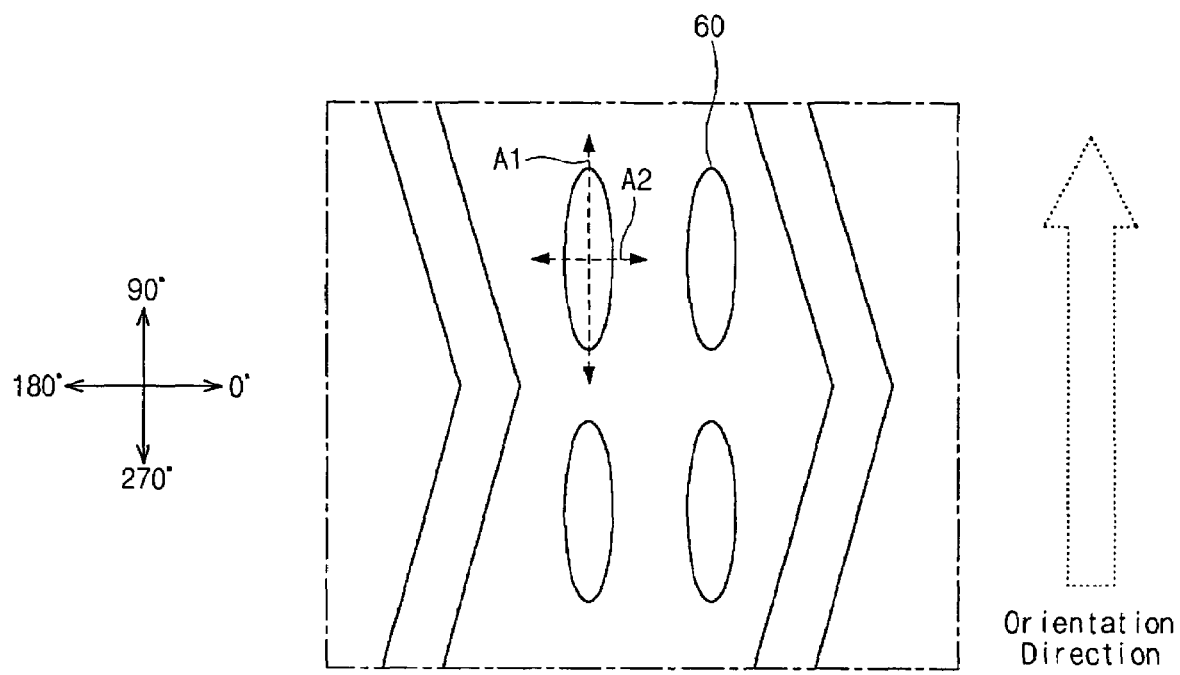
FIGS. 3A and 3B are schematic views showing re-alignment states of liquid crystal molecules in a normally black mode IPS-LCD device having a zigzag pattern according to the related art.
Figure 3B:
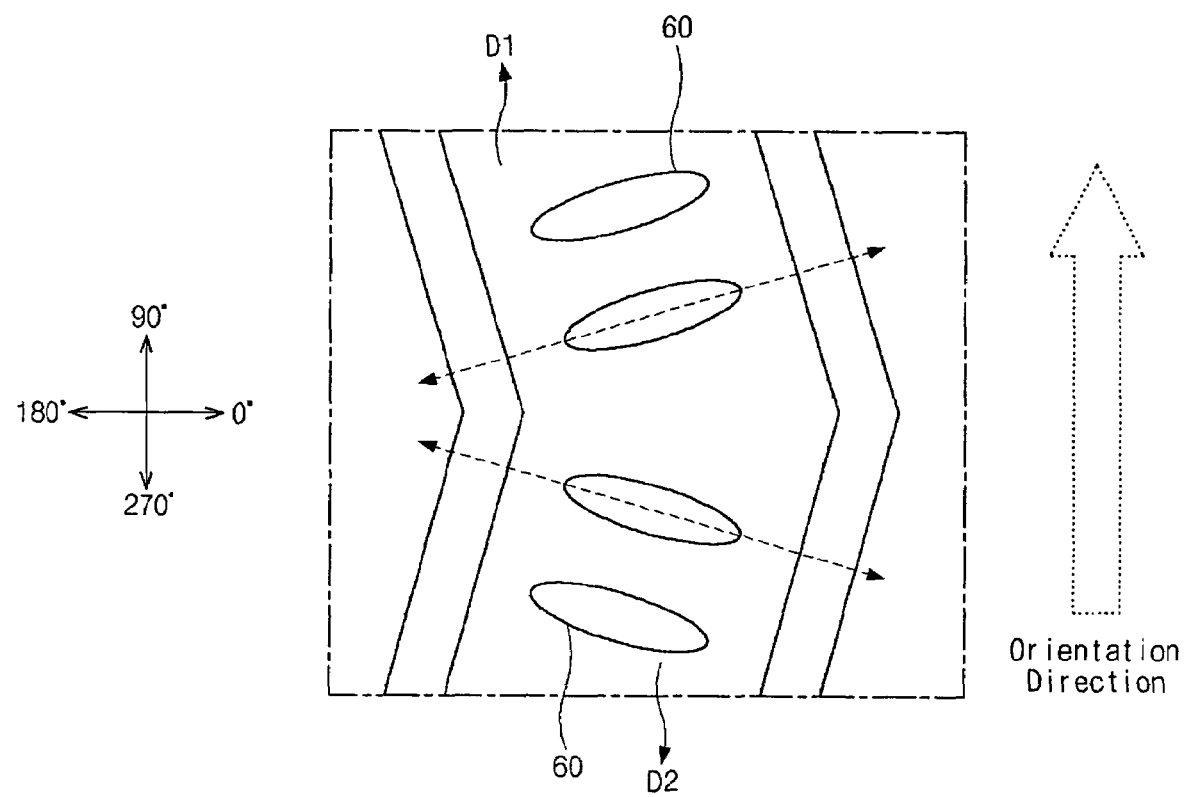
Figure 4:
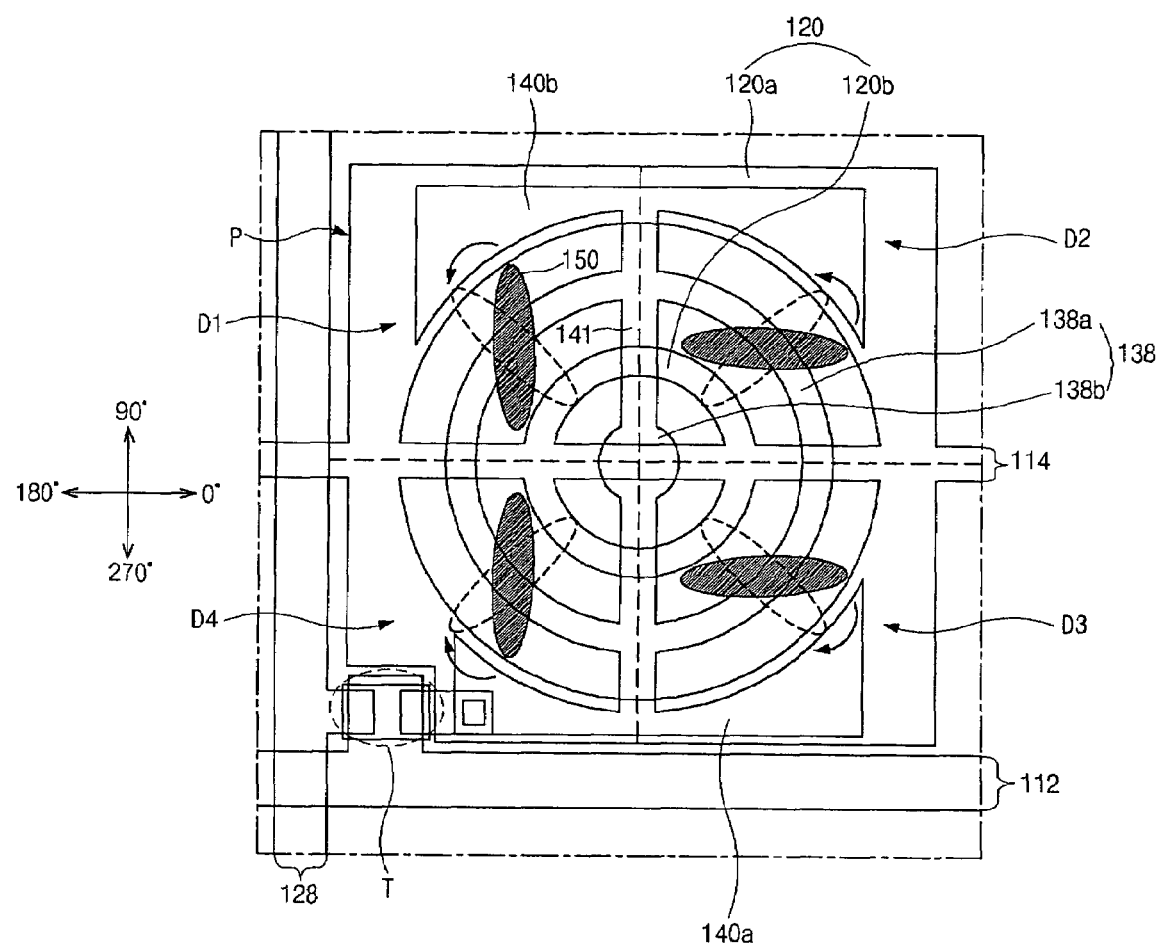
FIG. 4 is a plane view showing an IPS-LCD device according to a first embodiment of the present invention.

FIG. 4 is a plane view showing an IPS-LCD device according to a first embodiment of the present invention. FIG. 4 shows one pixel region of an IPS-LCD device. A gate line 112 is transversely arranged across FIG. 4 and a data line 128 is disposed substantially perpendicular to the gate line 112. Pairs of gate and data lines 112 and 128 define a pixel region "P." A common line 114 is parallel to and spaced apart from the gate line 112. A thin film transistor (TFT) "T" is disposed near the crossing of the gate and data lines 112 and 128. A common electrode 120 including first and second common electrode patterns 120a and 120b extends from the common line 114. A pixel electrode 138 including first and second pixel electrode patterns 138a and 138b is connected to the TFT "T." The pixel electrode 138 alternates with the common electrode 120.

The first common electrode pattern 120a has a substantially rectangular outer side adjacent to the boundary portion of the pixel region "P" and an inner circular side. The second common electrode pattern 120b has a ring shape and is disposed inside the first common electrode pattern 120a. The first pixel electrode pattern 138a has a ring shape and is disposed between the first and second common electrode patterns 120a and 120b. The second pixel electrode pattern 138b has a discal shape and is disposed inside the second common electrode pattern 120b. A first capacitor electrode 140a and a second capacitor electrode 140b overlap a bottom portion of the first common electrode pattern 120a and a top portion of the first common electrode pattern 120a, respectively. A pixel connecting line 141 combines the first and second capacitor electrodes 140a and 140b. The first and second pixel electrode patterns 138a and 138b extend from the pixel connecting line 141.

The pixel region "P" may be divided into four sub-regions by the common electrode 114 and the pixel connecting line 141 and the four sub-regions constitute first to fourth domains "D1," "D2," D3" and "D4," respectively, where liquid crystal molecules 150 are aligned along directions different from each other when a voltage is applied. To obtain the compensation effect between neighboring domains along a direction parallel to the gate line 112, orientation treatment is performed along 90° direction (or 135° direction) with respect to a direction parallel to the gate line 112 in the first and fourth domains "D1" and "D4," while the orientation treatment is performed along 0° direction (or 45° direction) in the second and third domains "D2" and "D3." When a voltage is not applied, the alignment direction of the liquid crystal molecules 159 is determined by the orientation direction. Thus, if the orientation treatment is performed such that the liquid crystal molecules 150 in the neighboring domains have alignment states to compensate retardation therebetween, brightness property of black color showing bluish color without an applied voltage is improved.

The orientation treatment may be performed using one of a rubbing method, a photo-orientation method, a plasma method, an ion beam method and an electron beam method. In a plasma method, plasma physically impacts onto an orientation film. In an electron beam method, ions impact the orientation film. In an ion beam method, electrons impact the orientation film.

The arrows in FIG. 4 near the liquid crystal molecules 150 designate the moving directions of the liquid crystal molecules 150 when a voltage is applied. Upper and lower polarizing plates having polarization axes perpendicularly crossing each other may be used for an IPS-LCD device according to the first embodiment of the present invention. For example, the upper and lower polarizing plates have polarization axis of 0° to 180° and polarization axis of 90° to 270°, respectively.

Figure 5:
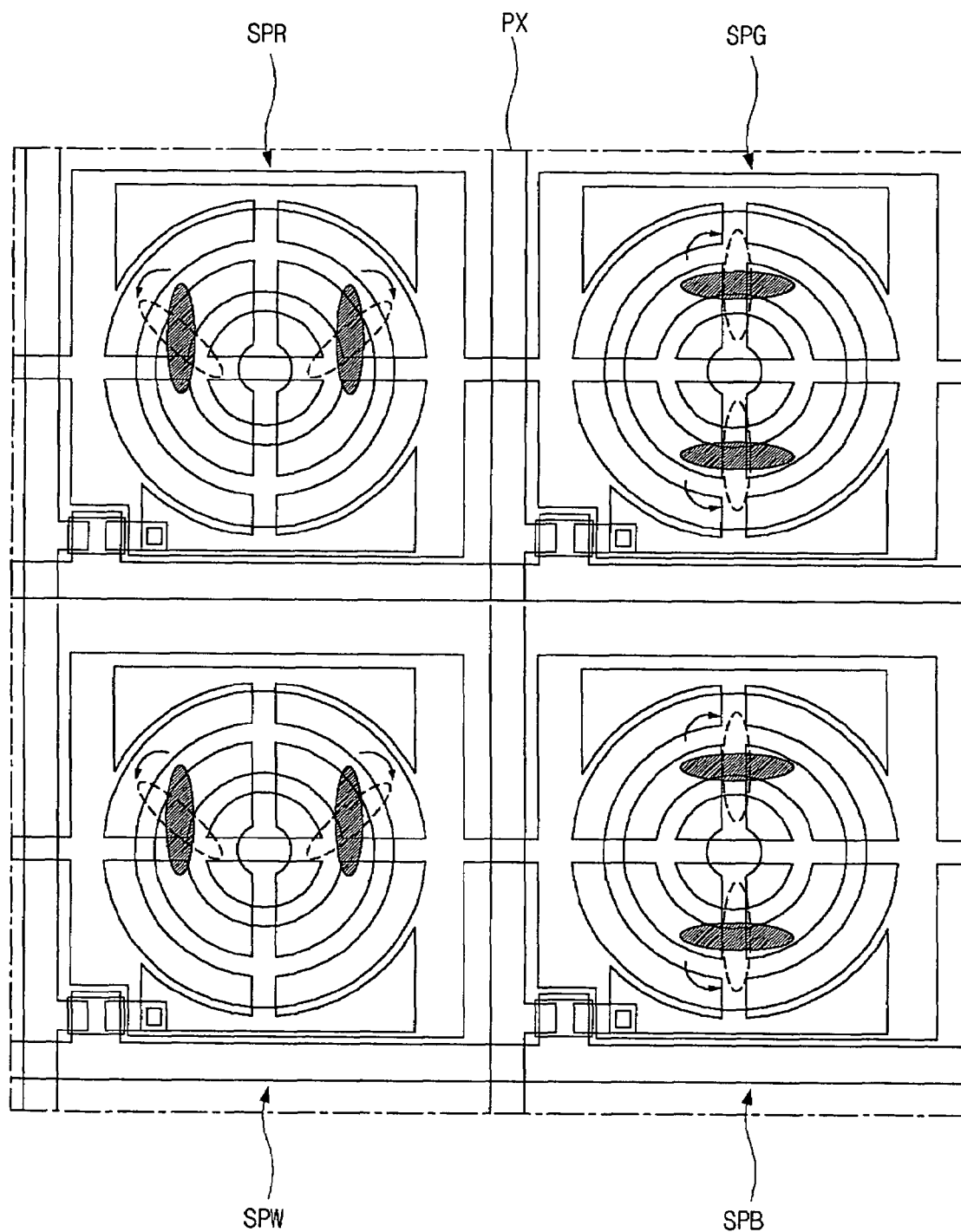
FIG. 5 is a plane view showing an IPS-LCD device according to a second embodiment of the present invention.

FIG. 5 is a plane view showing an IPS-LCD device according to a second embodiment of the present invention. FIG. 5 shows one pixel region including four sub-pixel regions. As shown in FIG. 5, an IPS-LCD device includes red, green, blue and white sub-pixel regions "SPR," "SPG," "SPB" and "SPW" having a square shape. The red, green, blue and white sub-pixel regions "SPR," "SPG," "SPB" and "SPW" constitute one pixel region "PX." In a high-resolution model of UXVGA having an area of 1600 mm×1200 mm, since one sub-pixel region becomes small, an orientation treatment may be performed such that liquid crystal molecules in the neighboring sub-pixel regions have alignment states to compensate retardation therebetween. For example, orientation treatment may be performed along 90° direction (or 135° direction) with respect to a direction parallel to a gate line in the red and white sub-pixel regions "SPR" and "SPW," while the orientation treatment may be performed along 0° direction (or 45° direction) in the green and blue sub-pixel regions "SPG" and "SPB." Thus, brightness property of black color without an applied voltage is improved. The orientation treatment may be performed using one of a rubbing method, a photo-orientation method, a plasma method, an ion beam method and an electron beam method. Even though not shown in figures, the common electrode and the pixel electrode may have an elliptical shape.

In an IPS-LCD device according to the present invention, orientation treatment is performed such that liquid crystal molecules in neighboring domains or neighboring sub-pixel regions have alignment states to compensate retardation therebetween when a voltage is not applied. Thus, the effect of color shift is diminished in the multi-domain pixels or sub-pixels. Accordingly, the black color is improved. Moreover, since the IPS-LCD has a common electrode with a circular shape and a pixel electrode with a circular shape, directors of liquid crystal molecules are the same in all directions. Thus, contrast ratio and viewing angle are improved without color inversion at any angle.

It will be apparent to those skilled in the art that various modifications and variation can be made in an IPS-LCD device of the present invention without departing from the spirit or scope of the invention. Thus, it is intended that the present invention cover the modifications and variations of this invention provided they come within the scope of the appended claims and their equivalents.

What is claimed is:

1. An in-plane switching mode liquid crystal display device, comprising:
    first and second substrates facing and spaced apart from each other;
    a plurality of gate lines on the first substrate;
    a plurality of data lines crossing the plurality of gate lines to define a plurality of sub-pixel regions;
    a thin film transistor connected to the gate line and the data line;
    a common line parallel to and spaced apart from the gate line;
    a common electrode extending from the common line and having a ring shape;
    a pixel electrode connected to the thin film transistor and having a ring shape, the pixel electrode alternating with the common electrode;
    a liquid crystal layer between the pixel electrode and the second substrate, the liquid crystal layer in neighboring sub-pixel regions having orientation directions different from each other;

a first capacitor electrode connected to the thin film transistor;

a second capacitor electrode overlapping the common electrode; and a pixel connecting line combining the first and second capacitor electrodes.

2. The device of claim 1, wherein each sub-pixel region has a square shape.

3. The device of claim 2, wherein neighboring four sub-pixel regions display red, green, blue and white colors, respectively, and constitute one pixel region.

4. The device of claim 3, wherein first and second orientation directions of the liquid crystal layer in neighboring two sub-pixel regions are substantially perpendicular to each other.

5. The device of claim 4, wherein the first orientation direction is one of 0° direction and 45° direction with respect to a direction parallel to the gate line, and the second orientation direction is one of 90° direction and 135° direction.

6. The device of claim 5, further comprising a first polarizing plate outside the first substrate and a second polarizing plate outside the second substrate, wherein the first polarizing plate has a first direction of 90° to 270° and the second polarizing plate has a second direction of 0° to 180°.

7. The device of claim 1, wherein the liquid crystal layer is oriented using one of a rubbing method, a photo-orientation method, a plasma method, an ion beam method and an electron beam method.

8. A method of fabricating an in-plane switching mode liquid crystal display device, comprising:

forming a plurality of gate lines on a first substrate;

forming a plurality of data lines crossing the plurality of gate lines to define a plurality of sub-pixel regions;

forming a thin film transistor connected to each of the gate lines and the data lines;

forming a common line parallel to and spaced apart from the gate line;

forming a common electrode extending from the common line and having a ring shape;

forming a pixel electrode connected to the thin film transistor and having a ring shape, the pixel electrode alternating with the common electrode;

forming a first capacitor electrode connected to the thin film transistor, a second capacitor electrode overlapping the common electrode and a pixel connecting line combining the first and second capacitor electrodes;

attaching the first substrate and a second substrate such that the first substrate faces and is spaced apart from the second substrate;

forming a liquid crystal layer between the first and second substrates;

orientating the liquid crystal layer in neighboring sub-pixel regions to have orientation directions different from each other.

\* \* \* \* \*